Patented Mar. 22, 1927.

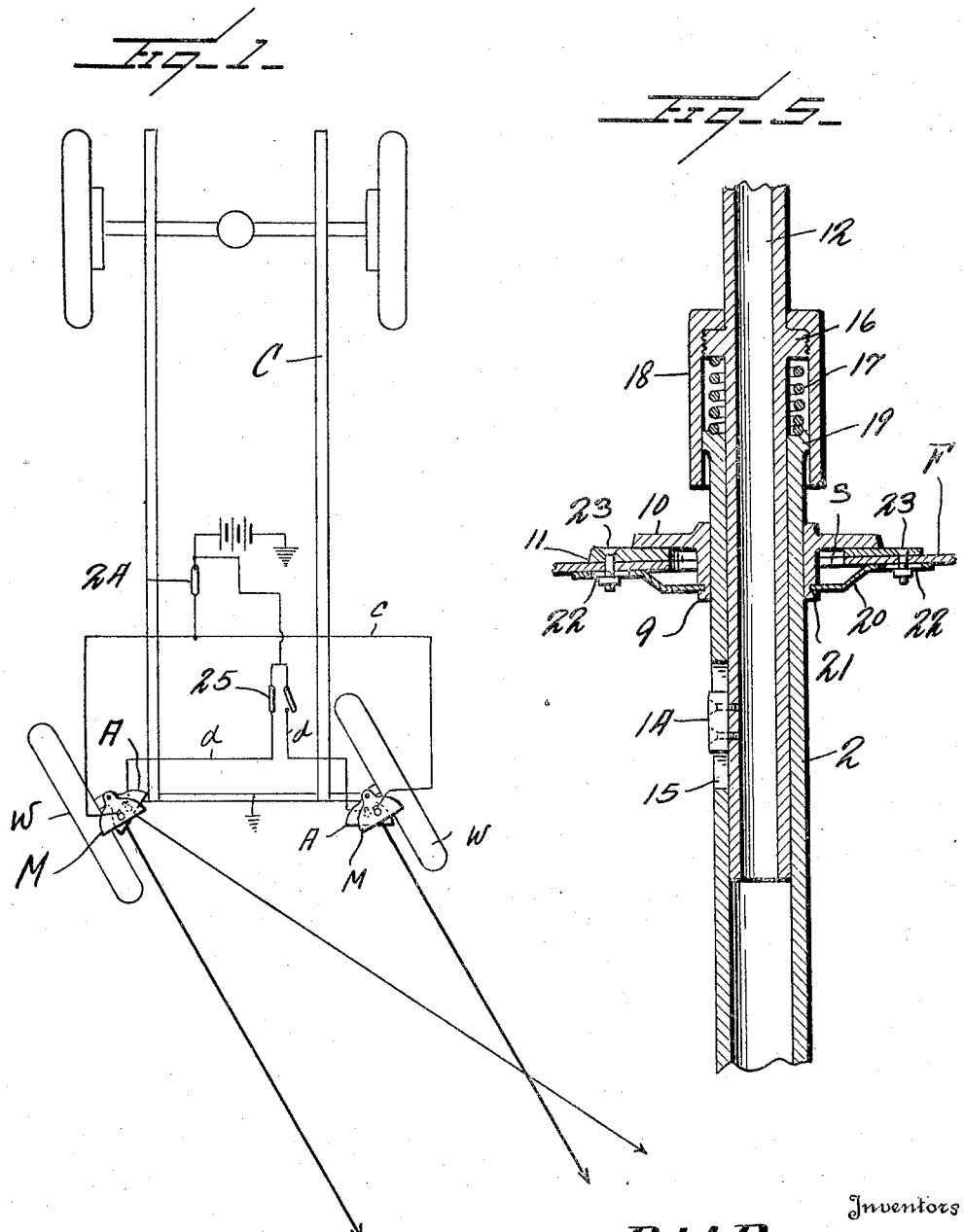

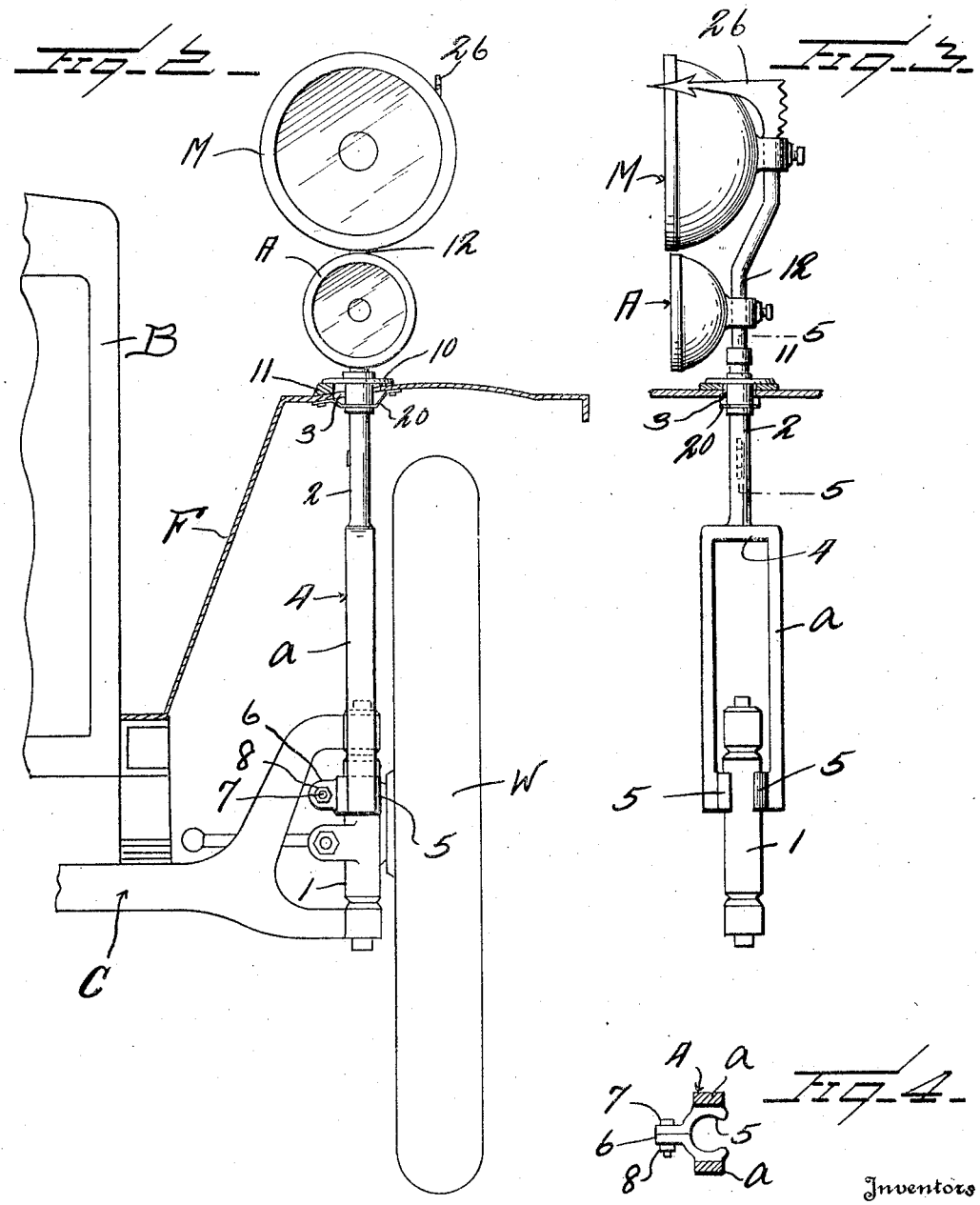

1,621,920

UNITED STATES PATENT OFFICE.

ROGERS W. BERRY AND GEORGE W. BIRD, OF GREAT FALLS, MONTANA.

LIGHT MECHANISM FOR VEHICLES.

Application filed October 8, 1925. Serial No. 61,274.

This invention relates to light mechanisms for vehicles and it is an object of the invention to provide a mechanism of this kind comprising an arrangement of lights or lamps movable in a direction whereby the rays of light are projected at all times, when the lamp or lamps are in operation, forward of and in alignment with the plane or lines of progressive motion of the front or steering wheels.

Another object of the invention is to provide a mechanism of this kind comprising an arrangement of lights or lamps supported and operated in a manner whereby the rays of light will follow the road and illuminate the road, whether the road be curved or straight for a safe working distance ahead of the vehicle, the action of the lamp or lamps responding automatically and immediately to any steering movement of the front wheels of the vehicle.

An additional object of the invention is to provide a mechanism of this kind wherein a main lamp and an auxiliary lamp are supported at each side of the vehicle for rotation about a vertical axis, said lamps being under independent control, one of said lamps being adapted to operate when the vehicle is having turning movement from the opposite side of the vehicle and directing its beam of light in a direction angular to the direction of beam of light of the second lamp whereby is afforded extended illumination of the roadway on the inside or concave portion of a road curve.

The invention consists in the details of construction and in the combination and arrangement of the several parts of our improved light mechanism for a vehicle whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:—

Figure 1 is a diagrammatic view in plan illustrating a mechanism constructed in accordance with an embodiment of our invention in applied position;

Figure 2 is a view partly in front elevation and partly in section illustrating the mechanism in applied position at one side of a vehicle;

Figure 3 is a fragmentary view in side elevation of the mechanism as illustrated in Figure 2, the vehicle proper being omitted;

Figure 4 is a detailed sectional view partly in top plan and partly in section illustrating the means herein disclosed for attaching the vertically disposed member to the spindle body bushing;

Figure 5 is an enlarged fragmentary sectional view taken substantially on the line 5—5 of Figure 3.

As disclosed in the accompanying drawings, C denotes the chassis of a motor driven vehicle upon which is supported in any desired manner the body B and wherein each end portion of the front axle has operatively engaged therewith the spindle body bushing 1 comprised in the mounting for a front steering wheel W. Carried by the body B and disposed over said wheel W is a fender F of desired design and construction. The steering wheels W are adapted to be operated in unison and in the same general direction by any means preferred.

A tubular post 2 has its upper portion freely disposed through an opening 3 in the fender F in proper position. The lower portion of the post 2 is continued by an elongated fork 4 the free end portions of the arms $a$ of which being provided with the opposed jaws 5 adapted to receive therebetween and effectively clamp the spindle body bushing 1 whereby the post 2 is supported in applied position and in a manner whereby it will rotate with the bushing 1 in the same direction and in unison.

As is particularly illustrated in detailed Figure 4, the jaws 5 at adjacent ends are provided with the outstanding ears 6 through which is disposed a bolt 7. Coacting with the bolt 7 is a nut 8, proper turning of the nut 8 causing the jaws 5 to have effective clamping engagement with the bushing 1. Disposed from above through the opening 3 in the fender F is a sleeve 9 through which the tubular post 2 is snugly directed, the upper portion of said sleeve 9 being provided with an outstanding annular flange 10 adapted to contact from above with the filler or bearing plate 11 suitably secured to the upper surface of the fender F and defining the opening 3. It is to be particularly noted in Figures 2 and 5 that this plate 11 is of such cross sectional configuration to normally provide a substantially horizontal upper surface so that the flange 10 will have effective contact therewith.

Telescopically engaged within the upper portion of the post 2 is the lower portion of a lamp post 12 the same being adapted to have limited endwise movement independently of the post 2. The lamp post 12, however, is held against rotary movement independently of the post 2 by the outstanding key 14 carried by the inserted portion of the post 12 and engaged within the longitudinally disposed slot 15 provided in the wall of the post 2. It is to be noted in Figure 5 that the slot 15 is of a length materially in excess of the length of the key 14 so that the post 12 will have desired lengthwise movement independently of the post 2.

The post 12 is provided with an outstanding annular flange 16 which, when the post 12 is in applied position with respect to the post 2, is positioned above but in relatively close proximity to the upper end of the post 2 and interposed between said flange 16 and the upper end of the post 2 is an expansible member 17, herein disclosed as a coil spring, encircling the post 12. This expansible member or spring 17 is of sufficient tension to effectively absorb the shocks and jars or road hammering incident to travel. The applied member or spring 17 is housed within a cap 18 threaded upon the flange 16 and having its side wall of a length to receive the upper end of the post 2, said upper end of the post 2 being preferably provided with an outstanding annular flange 19 having close contact at all points with the inner surface of the side wall of the cap 18.

As is particularly illustrated in Figure 5, it is to be noted that the opening 3 in the fender F is of a diameter considerably in excess of the major diameter of the sleeve 9 in order to compensate for the lateral vibrations of the body B with respect to the chassis C.

The flange or plate 10 is maintained in sliding contact with the upper surface of the plate 11 by the bow spring 20 the central portion of which being in swiveled engagement, as at 21, with the lower portion of the sleeve 9. The extremities of the spring 20 are provided with the longitudinally disposed and relatively long slots 22 through which are extended the projecting portions of the bolts 23 for holding the plate 11 to the fender F, said slots 22 being of a length to compensate for the usual lateral vibrations of the body B.

Clamped or otherwise affixed to the upper portion of the lamp post 12 is the main lamp M so adjusted that when in operation, the beam emitted therefrom will be disposed forwardly of the plane of the adjacent steering wheel W so that said beam will follow the road straight ahead as well as on a curve or while passing other cars and thus eliminating worry and fear of accident occasioned by lack of illumination on that part of the road directly ahead of the vehicle, in turnouts and on curving roads over which said steering wheel is to travel a moment after being observed.

As herein disclosed, there is secured to the lamp post 12 below the main lamp M an auxiliary lamp A which is adapted to be adjusted whereby its beam of light is emitted in a direction angular to the beam of the adjacent main lamp M and in a direction across the front of the vehicle. This lamp A is suitably clamped to the post 12 in a manner whereby its desired adjustment may be effectively accomplished and maintained. Both of the lamps M is interposed in a conventional operating circuit $c$ under control of any desired switch 24 while each of the lamps A has its independent circuit $d$ under control of a separate switch 25. The switches 24 and 25 are adapted to be positioned upon the dash or other desired point upon the body B and in practice the various conductors and the lamps M and A will be disposed through the posts 2 and 12 but as this is an obvious expedient it is not believed that a detailed description and illustration thereof is necessary. In practice, when a turn is to be made and the driver of the car believes that additional information should be had along the inside or concave portion of such curve a switch 25 is closed to operate an auxiliary lamp A at the side of the car remote from such direction of turn thereby affording further extended illumination as is believed to be clearly indicated by the heavy beam lines in Figure 1 of the accompanying drawings.

We also find it of advantage to provide the upper portion of each of the lamp posts 12 with a forwardly directed indicator 26 in the form of an arrow or the like. This indicator 26 is so adjusted or arranged that at all times it corresponds with the actual direction assumed by the front wheels whereby the operation of the vehicle is materially facilitated when in traffic jams and in passing obstacles in the road or wherever encountered.

From the foregoing description it is thought to be obvious that a light mechanism for a vehicle constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

1. In combination with a vehicle and a front steering wheel therefor, a vertically disposed post carried by the forward portion of the vehicle, means operated upon steering movement of the wheel for correspondingly turning the post, and a pair of lamps mounted upon the post, the beams of light emitted from said lamps being angularly related laterally with respect to the direction of travel of the vehicle, one of said lamps directing a beam at all times in the direction of travel of the steering wheel, the beam from the second lamp being disposed across the front of the machine.

2. In combination with a vehicle and front steering wheels therefor, a pair of lamps supported at the forward portion of the vehicle at opposite sides thereof, each pair of lamps having lateral swinging movement complemental to the steering movement of the wheels, each pair of lamps comprising a main lamp emitting a beam disposed at all times in a forward direction in advance of the adjacent steering wheel, the second lamp of each pair constituting an auxiliary lamp emitting a beam of light in a direction across the front of the vehicle, each of the auxiliary lamps operating independently of each other and of the main lamps.

3. In combination with a vehicle frame, front steering wheels therefor, a body on the frame, fenders carried by the body extending over the steering wheels, a vertically disposed post at each side of the vehicle and extending through a fender, means for operatively connecting the lower portion of the post with the adjacent steering wheel for automatically rocking said post upon steering movement of said wheel, a lamp post telescopically engaged within the upper portion of the first named post, said lamp post at a point above the first named post being provided with an outstanding flange, an expansible member interposed between said flange and the upper end of the first post for yieldably supporting the lamp post, a lamp carried by the lamp post, and a cap threaded upon said flange and overlying the upper portion of the first post.

4. In combination with a vehicle frame, front steering wheels therefor, a body on the frame, fenders carried by the body extending over the steering wheels, a vertically disposed post at each side of the vehicle and extending through a fender, means for operatively connecting the lower portion of the post with the adjacent steering wheel for automatically rocking said post upon steering movement of said wheel, a lamp post telescopically engaged within the upper portion of the first named post, yieldable means coacting with both of the posts for supporting the lamp post, a lamp carried by the lamp post, said fender having an opening of greater diameter than the first named post through which said post extends, a sleeve surrounding said first post and having an outstanding flange contacting from above with the fender.

5. In combination with a vehicle frame, front steering wheels therefor, a body on the frame, fenders carried by the body extending over the steering wheels, a vertically disposed post at each side of the vehicle and extending through a fender, means for operatively connecting the lower portion of the post with the adjacent steering wheel for automatically rocking said post upon steering movement of said wheel, a lamp post telescopically engaged within the upper portion of the first named post, yieldable means coacting with both of the posts for supporting the lamp post, a lamp carried by the lamp post, said fender having an opening of greater diameter than the first named post through which said post extends, a sleeve surrounding said first post and having an outstanding flange contacting from above with the fender, and a spring coacting with the sleeve and fender for maintaining the flange of the sleeve in engagement with the fender.

6. In combination with a vehicle frame, front steering wheels therefor, a body on the frame, fenders carried by the body extending over the steering wheels, a vertically disposed post at each side of the vehicle and extending through a fender, means for operatively connecting the lower portion of the post with the adjacent steering wheel for automatically rocking said post upon steering movement of said wheel, a lamp post telescopically engaged within the upper portion of the first named post, yieldable means coacting with both of the posts for supporting the lamp post, a lamp carried by the lamp post, said fender having an opening of greater diameter than the first named post through which said post extends, a sleeve surrounding said first post and having an outstanding flange contacting from above with the fender, and a spring coacting with the sleeve and fender for maintaining the flange of the sleeve in engagement with the fender, said spring being of a bow type and having its central portion in swiveled connection with the sleeve, the extremities of the spring contacting with the fender from below.

7. In combination with a vehicle frame, front steering wheels therefor, a body on the frame, fenders carried by the body extending over the steering wheels, a vertically disposed post at each side of the vehicle and extending through a fender, means for operatively connecting the lower portion of the post with the adjacent steering wheel for automatically rocking said post upon steering movement of said wheel, a lamp post telescopically engaged within the upper portion of the first named post, yieldable means coacting with both of the posts for supporting the lamp post, a lamp carried by the lamp post, said fender having an opening of greater diameter than the first named post through which said post extends, a sleeve surrounding said first post and having an outstanding flange contacting from above with the fender, a spring coacting with the sleeve and fender for maintaining the flange of the sleeve in engagement with the fender, said spring being of a bow type and having its central portion in swiveled connection with the sleeve, the extremities of the spring contacting with the fender from below, the extremities of the spring being provided with longitudinally disposed slots, and members depending from the fender and extending through said slots.

In testimony whereof we hereunto affix our signatures.

ROGERS W. BERRY.
GEORGE W. BIRD.